(12) United States Patent
Riesberg et al.

(10) Patent No.: US 8,032,614 B2
(45) Date of Patent: Oct. 4, 2011

(54) METHOD FOR CONFIGURING A WINDFARM NETWORK

(75) Inventors: André Riesberg, Wallenhorst (DE); Anke Eggengoor, Rheine (DE)

(73) Assignee: General Electric Company, Schenectady, NY (US)

( * ) Notice: Subject to any disclaimer, the term of this patent is extended or adjusted under 35 U.S.C. 154(b) by 542 days.

(21) Appl. No.: 11/380,939

(22) Filed: Apr. 30, 2006

(65) Prior Publication Data

US 2007/0255832 A1    Nov. 1, 2007

(51) Int. Cl.
*G06F 15/177* (2006.01)
*G06F 3/00* (2006.01)
*G05D 3/12* (2006.01)

(52) U.S. Cl. ........ 709/220; 709/221; 709/222; 700/286; 700/287; 710/9

(58) Field of Classification Search .......... 709/217–226; 710/9; 700/286–287
See application file for complete search history.

(56) References Cited

U.S. PATENT DOCUMENTS

| | | | |
|---|---|---|---|
| 5,410,730 A | 4/1995 | Longsdorf et al. | |
| 6,512,966 B2 * | 1/2003 | Lof et al. | 700/291 |
| 6,671,585 B2 | 12/2003 | Lof et al. | |
| 6,870,279 B2 | 3/2005 | Gilbreth et al. | |
| 6,890,152 B1 * | 5/2005 | Thisted | 416/1 |
| 6,925,385 B2 * | 8/2005 | Ghosh et al. | 702/14 |
| 6,934,532 B2 | 8/2005 | Coppinger et al. | |
| 6,982,953 B1 | 1/2006 | Swales | |
| 7,240,106 B2 * | 7/2007 | Cochran et al. | 709/222 |
| 7,318,154 B2 * | 1/2008 | Tehee, Jr. | 713/155 |
| 7,396,207 B2 * | 7/2008 | DeLong | 416/87 |
| 7,554,959 B1 * | 6/2009 | Dowling | 370/338 |
| 7,697,419 B1 * | 4/2010 | Donthi | 370/220 |
| 7,773,580 B2 * | 8/2010 | Yeom | 370/352 |
| 7,908,348 B2 * | 3/2011 | Kumar et al. | 709/220 |
| 2002/0029097 A1 * | 3/2002 | Pionzio et al. | 700/286 |
| 2002/0084655 A1 * | 7/2002 | Lof et al. | 290/44 |
| 2003/0009265 A1 | 1/2003 | Edwin | |
| 2005/0040655 A1 * | 2/2005 | Wilkins et al. | 290/44 |
| 2005/0163118 A1 * | 7/2005 | Steindl | 370/389 |
| 2006/0045074 A1 * | 3/2006 | Lee | 370/352 |
| 2006/0214428 A1 | 9/2006 | Altemark et al. | |
| 2006/0245404 A1 * | 11/2006 | Bajic | 370/338 |

(Continued)

FOREIGN PATENT DOCUMENTS

| | | | |
|---|---|---|---|
| CN | 1645867 A | | 7/2005 |
| WO | WO 01/82032 | * | 1/2001 |

OTHER PUBLICATIONS

Steel, Marcus D.W., "Networking Communications Integration of Substration Protection and Control With Large-Scale Wind Farm Control," entire document.*
http://www.peertopatent.org/prior_art/103/detail, printed Dec. 19, 2009.*
http://www.peertopatent.org/patent/20070255832/discussion, printed Dec. 19, 2009.*

(Continued)

*Primary Examiner* — Alina N. Boutah
(74) *Attorney, Agent, or Firm* — James McGinness, Esq.; Armstrong Teasdale LLP

(57) ABSTRACT

A method for automatically configuring a local network in a windfarm is provided, the method including the steps of (a) automatically assigning an IP address to a device connected to the local windfarm network, (b) automatically receiving an identifier tag from the device, and (c) relating the automatically assigned IP address of the device to a specific wind turbine in the windfarm which is identified by said identifier tag.

18 Claims, 8 Drawing Sheets

U.S. PATENT DOCUMENTS

2007/0018510 A1* 1/2007 Cardinal et al. ............... 307/153
2007/0266423 A1* 11/2007 Tehee, Jr. ........................... 726/3
2009/0281675 A1* 11/2009 Rasmussen et al. .......... 700/287
2010/0100249 A1* 4/2010 Molgaard ..................... 700/289

OTHER PUBLICATIONS

Chinese Office Action issued in connection with application CN 200710102388.6, Dec. 6, 2010.

* cited by examiner

METHOD FOR CONFIGURING A WINDFARM NETWORK

FIELD OF THE INVENTION

The present invention relates to a method for configuring a windfarm network. The present invention further relates to a windfarm network.

BACKGROUND OF THE INVENTION

Wind turbines for wind power generation are typically grouped into so-called windfarms or wind parks comprising from only a few wind turbines up to large numbers. Especially, large off-shore wind farms are projected comprising up to hundred wind turbines or more. Since during recent years regenerative wind energy production increased considerably, it is expected that the number of wind turbines in a wind farm will also increase.

Typically, wind farms have a centralized control unit that allows monitoring and control of the wind farm. Each of the wind turbines in a wind farm is connected to this centralized control via a windfarm local area network (LAN). Also, each of the turbines includes a number of devices like controllers, sensors or the like which are connected to the windfarm network. Typically, these devices are connected to a central switch of the wind turbine.

For the communication inside the windfarm LAN and also for communication with a host outside the windfarm, e.g. at a remote control center, typically the Internet Protocol standard (IP) is used. IP is a network layer protocol in the internet protocol suite and is an upper layer protocol that also provides globally unique addresses (e.g., MAC address for Ethernet) but two of these addresses will not necessarily be able to communicate to each other. IP adds a service on top of these data link layer protocols that provides the ability to uniquely identify with and communicate with any other device on the network.

Therefore, each device connected to the windfarm LAN requires an IP address for communication. In computer networking, an IP address (internet protocol address) is a unique number that devices use in order to identify and communicate with each other on a network utilizing the Internet Protocol standard (IP). Any participating network device—including switches, controllers, sensors—requires its own unique address.

In principle, there are two methods of assigning IP addresses to devices: dynamic and static. Dynamic IP addresses are assigned for a variable length of time. In order to use a dynamic IP address, a service such as Dynamic Host Configuration Protocol (DHCP) is used to assign an address to the requesting network device. The Dynamic Host Configuration Protocol (DHCP) is a client-server networking protocol providing a mechanism for allocation of IP addresses to client hosts. However, if DHCP is used for allocating IP addresses in a windfarm network the correlation between devices and wind turbines is lost. Therefore, it cannot be determined to which specific turbine a device belongs and, accordingly, also which devices belong to the same turbine. However, it is important to reliably and correctly identify a specific wind turbine in a wind park and its built-in components.

For this reason, currently the network settings in a windfarm network are done manually. In particular, the static IP addresses are manually assigned to the devices according to a predetermined static numbering scheme. This work consumes a large amount of time and may need even weeks to be finished for large windfarms. Also, the manual assignment process is error-prone. In particular, it may happen that the same IP address is assigned twice or that no IP address is assigned to a component of a wind turbine.

BRIEF DESCRIPTION OF THE INVENTION

In view of the above, a method for automatically configuring a local network in a windfarm is provided. The method includes the steps of (a) automatically assigning an IP address to a device connected to the local windfarm network, (b) automatically receiving an identifier tag from the device, and (c) relating the automatically assigned IP address of the device to a specific wind turbine in the windfarm which is identified by said identifier tag.

Thus, the manual process of assigning IP addresses in a windfarm can be automated. At the same time, the identifier tag allows to associate a device IP address to a specific wind turbine in the windfarm. Thus, it can be determined which devices belong to the same specific turbine. As a result, the network configuration can be done within hours instead of weeks. Furthermore, the network setup can be remotely controlled from a control center where technical experts may have access to the setup process.

Further aspects, advantages and features of the present invention are apparent from the dependent claims, the description and the accompanying drawings.

According to a first aspect of the invention, a method for self-configuration of a windfarm network is provided. The method includes the steps of (a) automatically allotting an IP address to a component linked to the windfarm network, (b) automatically obtaining an ID marker from the component, and (c) matching the automatically obtained IP address of the component to an individual wind energy plant in the windfarm, the wind energy plant being specified by the ID marker. Thus, the manual process of assigning IP addresses in a windfarm can be automated while the ID marker enables an operator to associate a component's IP address with an individual wind energy plant. As a result, the network configuration can be done within hours instead of weeks. Furthermore, the network setup can be remotely controlled from a control center where technical experts may have access to the setup process.

According to another aspect of the present invention, a method for the automatic configuration of a network in a windfarm is provided. The method includes the steps of automatically assigning IP addresses to components within the windfarm network, automatically determining the link structure of the windfarm network, automatically identifying subnetworks, receiving ID labels of the subnetworks, and attributing the automatically assigned IP addresses of the components belonging to a subnetwork to a wind turbine designated by said identifier tag.

According to an even further aspect of the present invention, a windfarm network is provided, wherein the windfarm network includes an ID marker transmitter which is adapted to transmit an ID marker over the network so that the IP address of a component connected to the network is unambiguously associated with a specified wind turbine of the windfarm by the ID marker.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
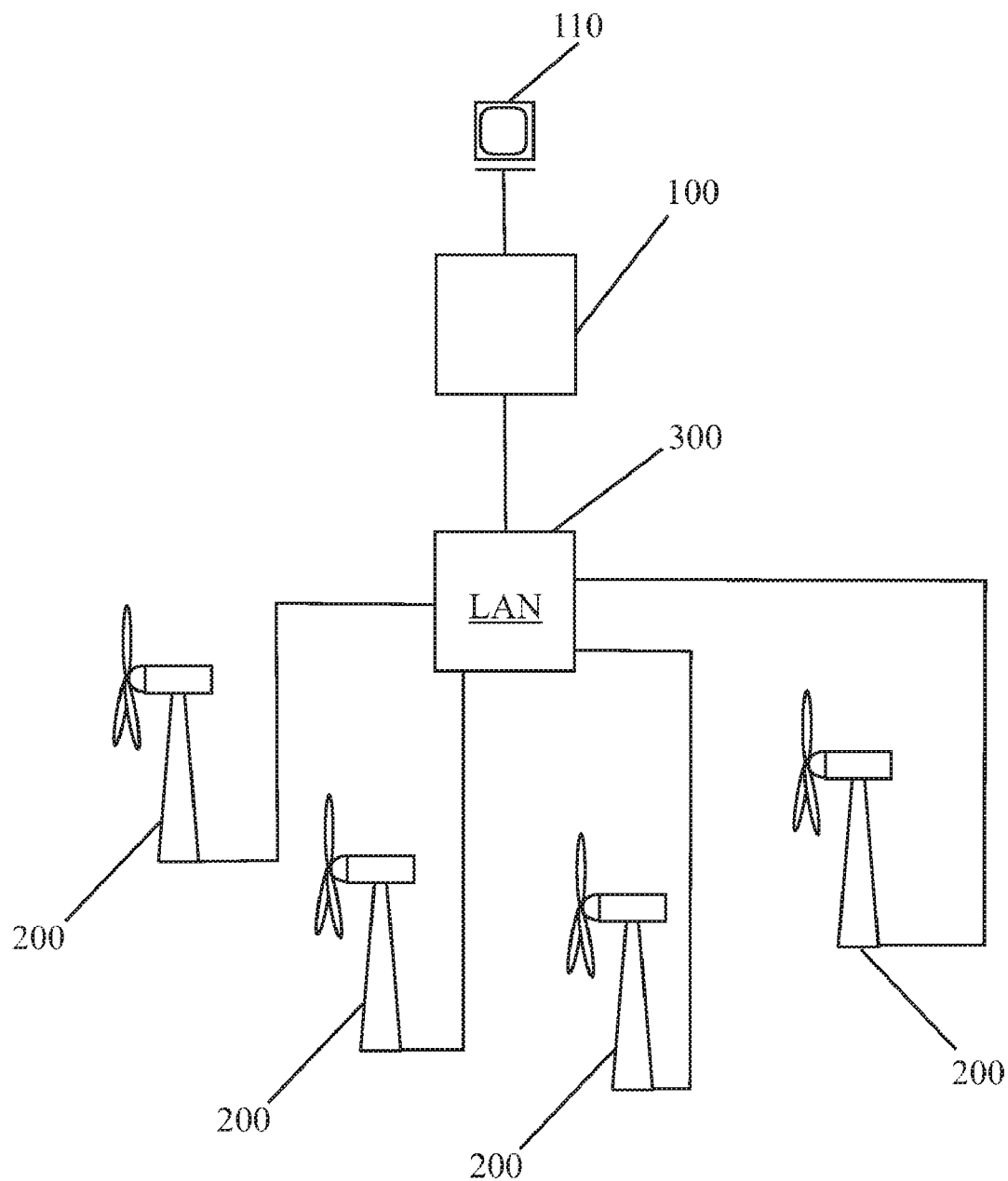
FIG. 1 shows a windfarm network.

FIG. 1 shows a windfarm network. Therein, a windfarm comprises several wind turbines 200. The wind turbines 200 are connected with each other via a windfarm LAN 300. The windfarm LAN 300 is also connected to a remote control center 100. Each wind turbine 200 can be accessed from remote control center 100 via windfarm LAN 300. Remote control center 100 includes a host 110 for accessing windfarm LAN 300. Typically, windfarm LAN 300 is connected to control center 100 via a secure internet connection, e.g. a VPN tunnel. Of course, windfarm LAN 300 may also be connected to control center 100 via a separate cable connection.

Figure 2:
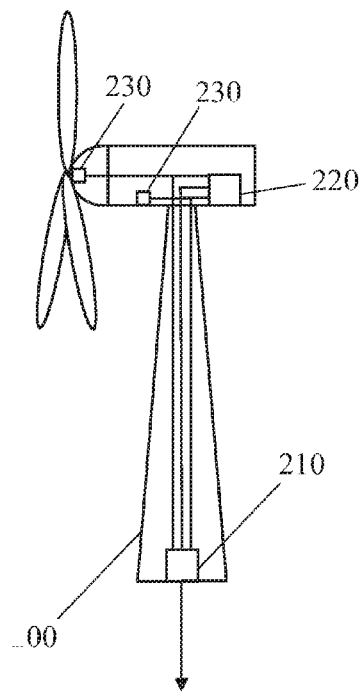
FIG. 2 shows an internal network of a wind turbine.

FIG. 2 shows a typical internal network of a wind turbine 200. Therein, wind turbine 200 includes a wind turbine switch 210. Switch 210 is adapted for handling the communication of internal devices 220, 230 of the wind turbine 200 with the network environment of wind turbine 200. Furthermore, wind turbine 200 includes a turbine controller 220 and various sensors 230 like vibration sensors, icing detectors, load detectors, voltage and current sensors etc. These sensors may be connected to turbine controller 220 and/or switch 210. Thus, switch 210, turbine controller 220 and the sensors 230 form an internal subnetwork of the wind turbine 200. Typically, this internal subnetwork is connected to the windfarm network via switch 210.

Figure 5:
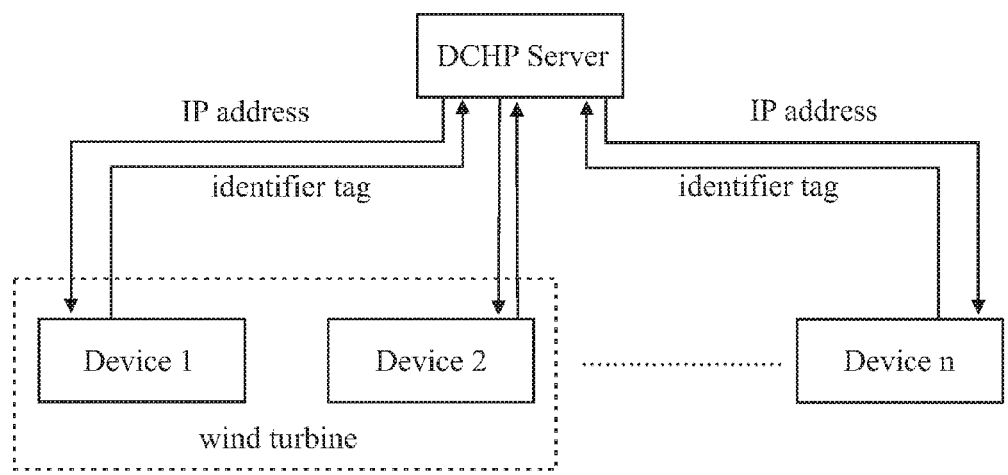
FIG. 5 is a block diagram of a windfarm network according to an embodiment of the present invention.
Figure 3:
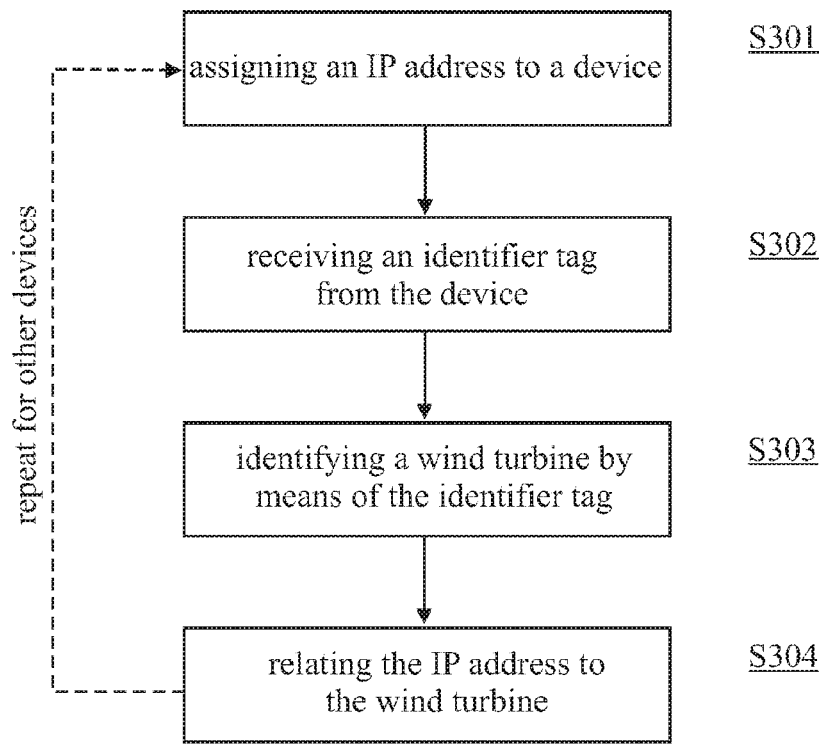
FIG. 3 is a flowchart of a configuration process according to an embodiment of the present invention.

Next, a configuration process of a windfarm network according to an embodiment of the present invention is described with simultaneous reference to FIGS. 3 and 5. FIG. 3 is a flowchart of the configuration process according to the embodiment of the present invention and FIG. 5 is a block diagram of a windfarm network according to an embodiment of the present invention. In the configuration process according to the present embodiment, an IP address is first assigned automatically to a device connected to the windfarm network, e.g. a switch 210 (Step S301). This can be done either statically or dynamically but is done automatically. This is also shown in FIG. 5, where a server assigns an IP address to Device 1. Next, an identifier tag is received from the device (S302). Typically, the identifier tag includes the name and/or number of the wind turbine. The device may send the identifier tag automatically after receipt of the IP address or may wait for a special request to send the identifier tag. After the identifier tag is received, the wind turbine in which the device is located can be determined from the identifier tag (S303). Finally, the assigned IP address of the device can be related to a specific wind turbine within the windfarm (S304). Thus, the manual process of assigning IP addresses in a windfarm can be automated so that the failure rate is reduced. At the same time, the identifier tag allows to associate the device IP address to a specific wind turbine in the windfarm. Thus, it can be easily and reliably determined to which of the wind turbines a device belongs.

Furthermore, the above process including steps S301 to 304 may be repeated for other devices in the windfarm network. As shown in FIG. 5, the process may be executed for every device through Device 1 to Device n. As a result, the configuration of the complete windfarm network can be done within hours instead of weeks. Furthermore, the network setup can be remotely controlled from a control center where technical experts may have access to the setup process. Moreover, it can be easily determined which devices are components of the same wind turbine since the IP addresses of the devices are related to individual wind turbines in the windfarm.

Figure 4:
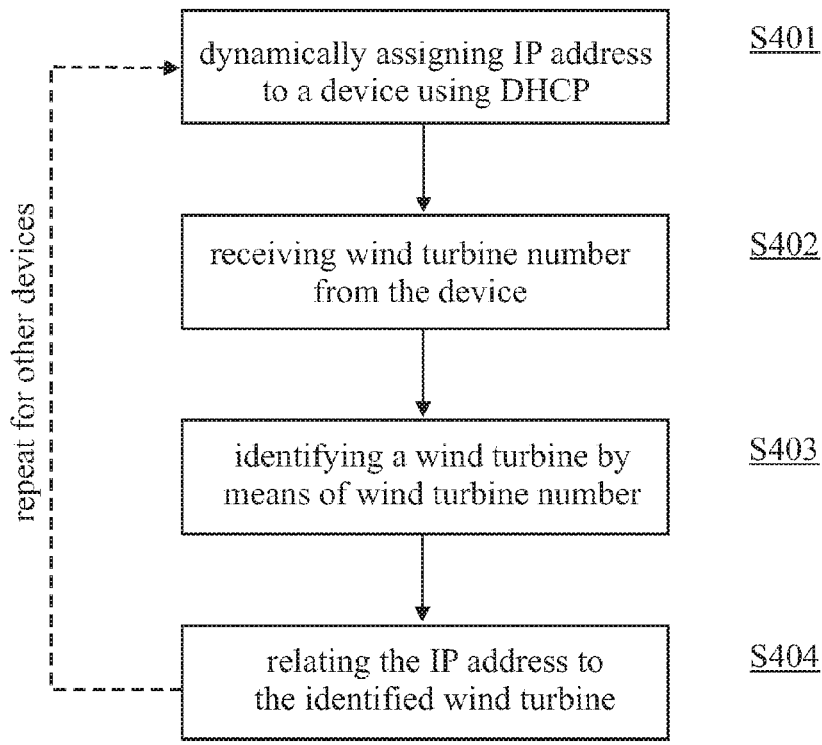
FIG. 4 is a flowchart of a configuration process according to another embodiment of the present invention.

FIG. 4 is a flowchart of a configuration process according to a specific implementation of the above described configuration process. Therein, the IP address is dynamically assigned to a device using a DHCP and a DCHP server (S401). In the second step, the number of the wind turbine is received from the device (S402) and the wind turbine is identified by means of this wind turbine number (S403). Finally, the IP address of the device is related to the identified wind turbine. Of course, this process may be repeated for other devices connected to the windfarm network.

Figure 6:
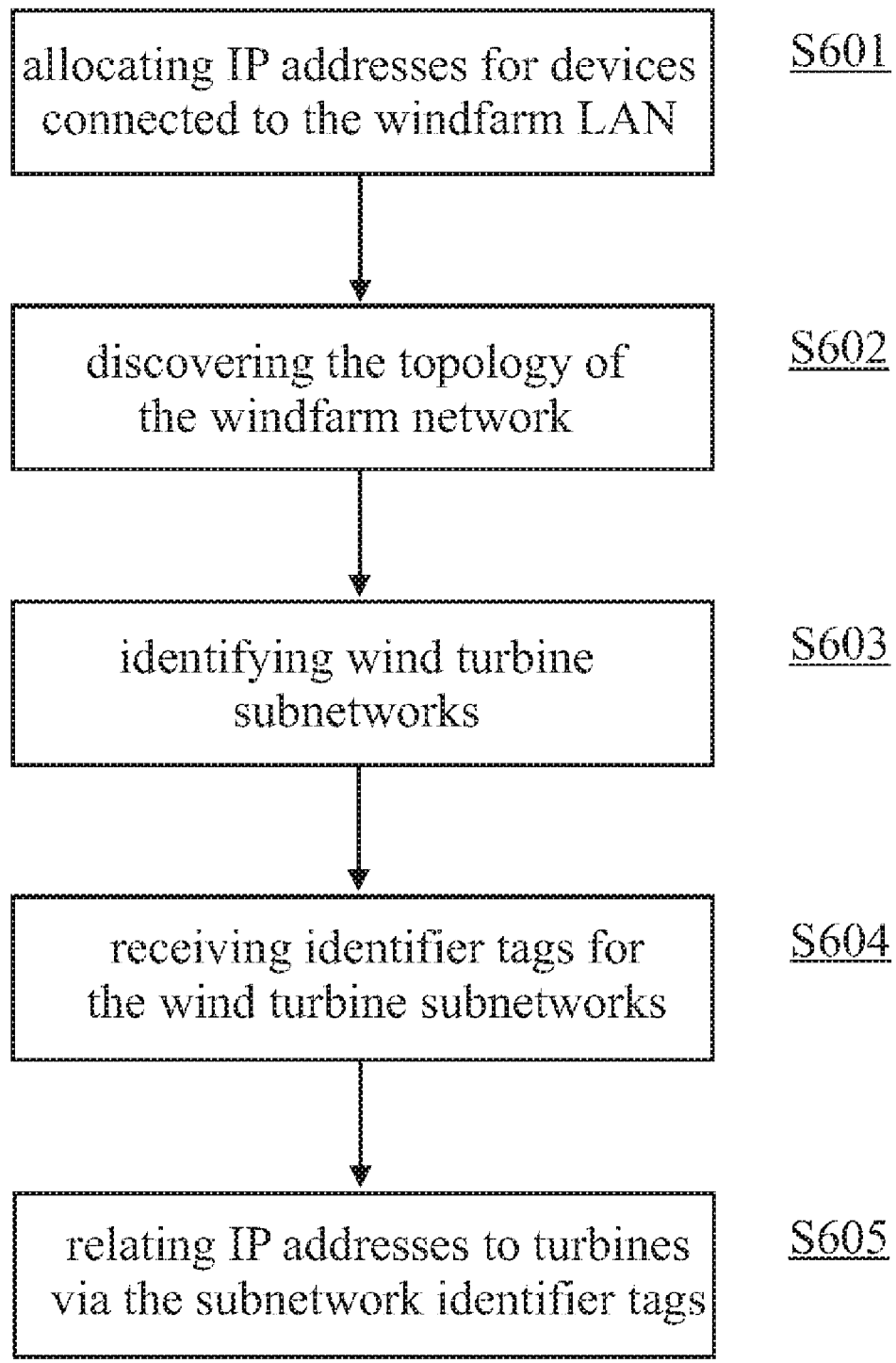
FIG. 6 is a flowchart of a setup process according to a further aspect of the present invention.

Next, a setup process according to another aspect of the present invention is described with reference to FIG. 6 showing a flowchart of such a setup process. In the configuration process according to the present embodiment, an IP address is first allocated automatically to a device connected to the windfarm network, e.g. a switch 210 (Step S601). This can be done either statically or dynamically but is done automatically. In the next step of the setup process, the network topology of the windfarm network is determined (Step S602). Thus, the structure if links between the devices connected to the windfarm LAN is discovered. In a next step, subnetworks are identified within the windfarm network (S603). Typically, the subnetworks correspond to wind turbines as has been described above with respect to FIG. 2. However, also other subnetworks may be included in the windfarm network, e.g. a subnetwork of a central windfarm control unit. Next, an identifier tag is received from the subnetwork (S604). Typically, the identifier tag includes the name and/or number of the wind turbine corresponding to the subnetwork. After the identifier tag is received, the wind turbine in which the subnetwork is located can be determined from the identifier tag. Finally, the IP addresses of the devices within the subnetwork can be related to a specific wind turbine within the windfarm (S605). Thus, the setup process of manually assigning IP addresses to devices in a windfarm can be automated. As a result, the configuration of the complete windfarm network can be done within hours instead of weeks and the failure rate can be reduced. Furthermore, the network setup can be remotely controlled from a control center where technical experts may have access to the setup process. Moreover, it can be easily determined which devices are components of the same wind turbine. Finally, the complete windfarm network topology is automatically determined so that the location of defect or replaced components can be automatically detected.

Figure 7:
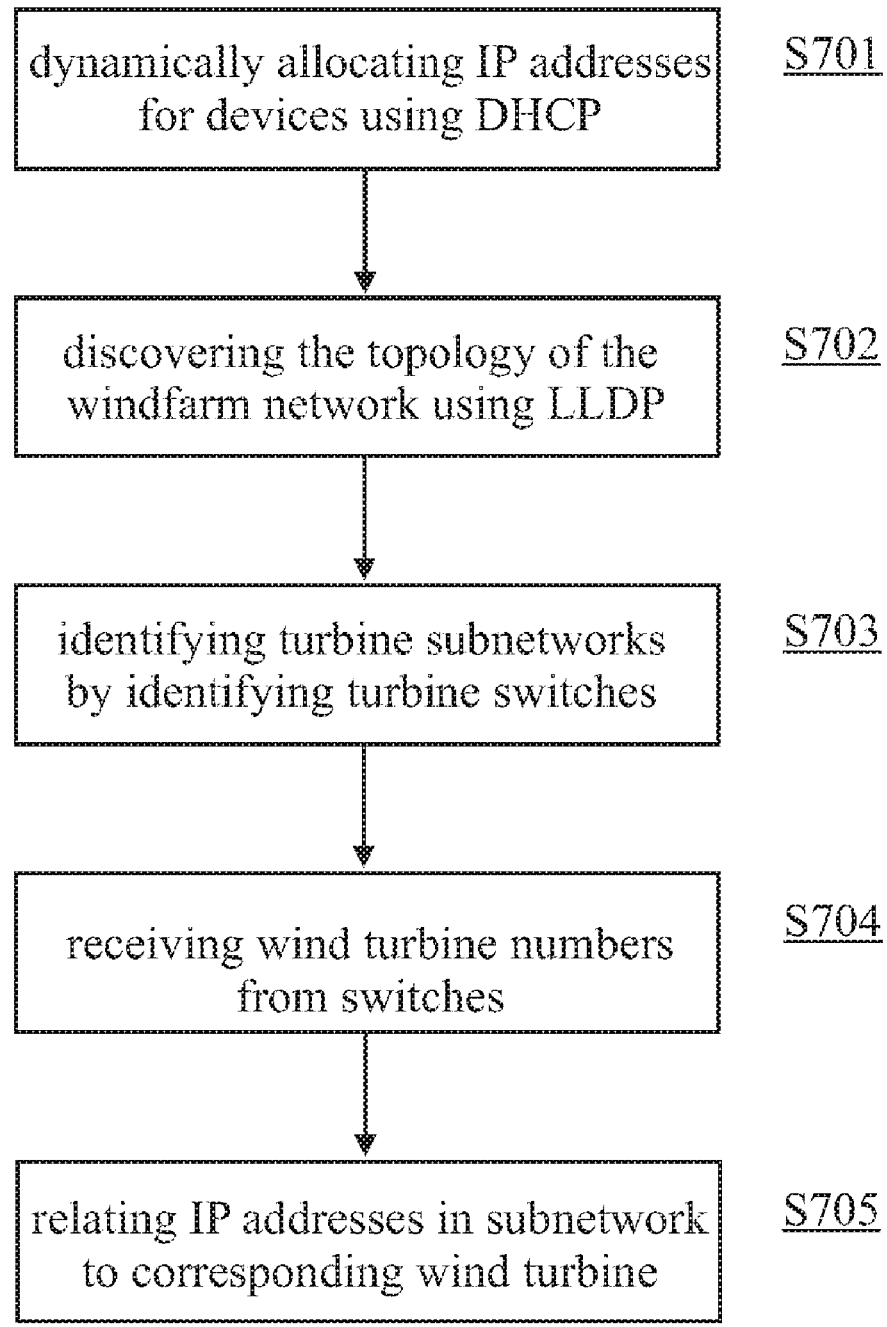
FIG. 7 is a flowchart of a setup process according to a further embodiment of the present invention.
Figure 9:
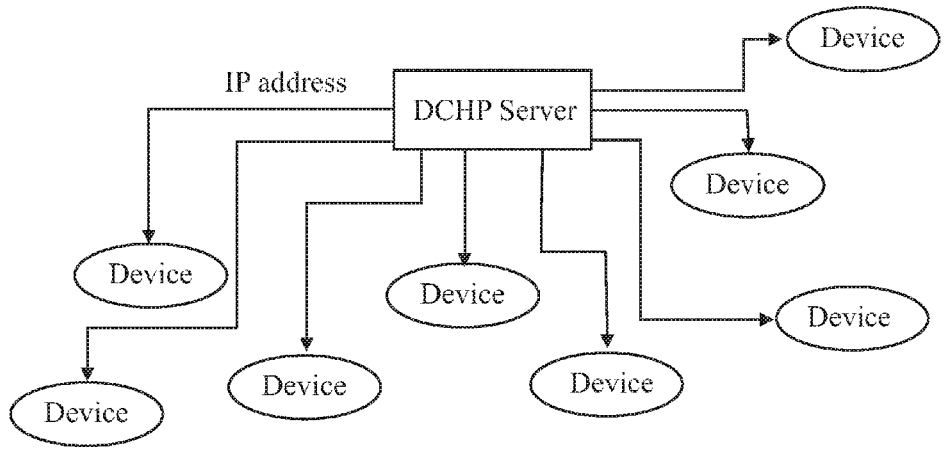
FIG. 9 is a block diagram of a windfarm network showing a first step in a setup process according to an embodiment of the present invention.

FIG. 7 is a flowchart of a setup process according to a specific implementation of the above described setup process. Therein, the IP addresses are dynamically assigned to the devices within the windfarm network using a DHCP (Step S701). This is also shown in FIG. 9 in which a DCHP server dynamically assigns IP addresses to devices. However, it is apparent from FIG. 9 that the network topology is not known at this stage. In the next step of the setup process, the network topology of the windfarm network is automatically determined using a link layer discovery protocol LLDP (Step S702).

Figure 11:
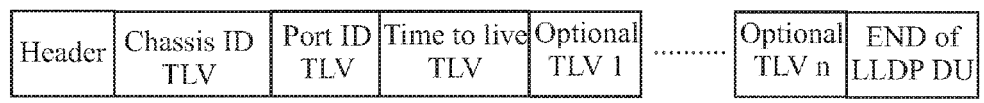
FIG. 11 shows the configuration of an LLDP package.

The link layer discovery protocol LLDP is a vendor-neutral Layer 2 protocol that allows a network device to send information about itself to its neighbors and to receive such information from its neighbors. The received information can be stored in a LLDP management information base (LLDP MIB). The information stored in the LLDP MIB can be accessed by a network management station (NMS) via SNMP (simple network management protocol). The LLDP was formally ratified as IEEE standard 802.1AB-2005 in May 2005. The structure of a LLDP package is shown in FIG. 11. The LLDP package starts with a header containing an IEEE destination MAC address, a source MAC address and an LLDP Ethertype followed by an LLDP data unit. The LLDP DU contains information blocks encoded in a type length value (TLV) format. Compulsory information includes a chassis ID of the device, a port ID of the device, a time-to-live, and an END block. Between the time-to-live block and the END block several optional blocks TLV 1 to TLV n may be provided. Optional blocks TLV 1 to TLV n may include additional user-defined information, e.g. a wind turbine name and/or number.

Figure 10:
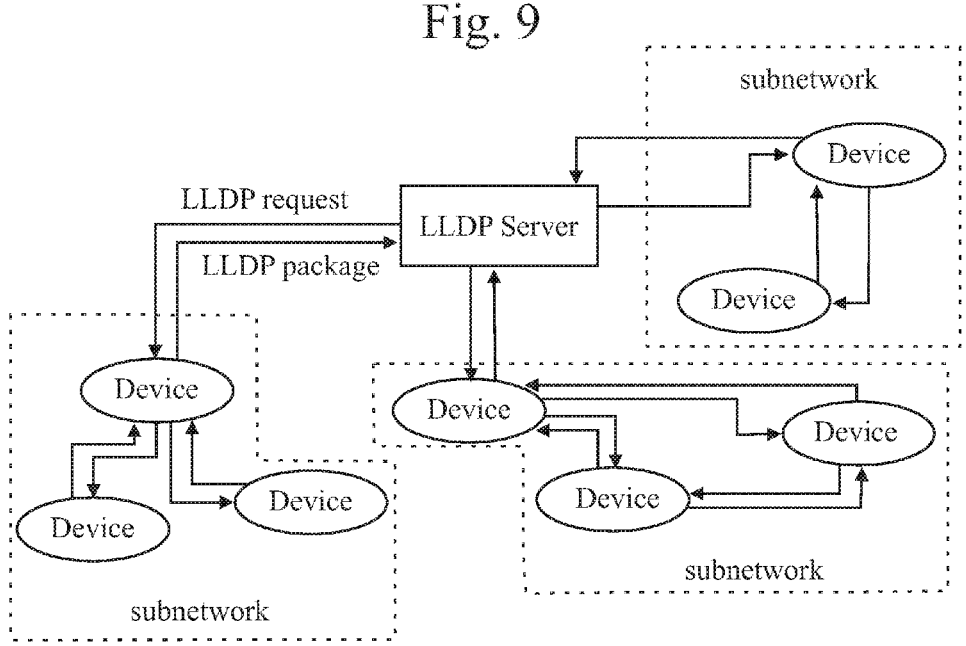
FIG. 10 is a block diagram showing a further step in the setup process according to an embodiment of the present invention.

The step S702 of discovering the network topology is also shown in FIG. 10. Therein, it can be seen that an LLDP server, which is typically identical with the DHCP server of Step S701, starts to discover its neighbors and that each of its neighbors discovers its respective neighbors. Thus, the network topology is discovered. In the next step, wind turbine subnetworks are identified in that wind turbine switches are identified from the LLDP information (Step S703), wherein wind turbine numbers are received from the switches (Step S704). Typically, the wind turbine number of a specific wind turbine including the switch is included in one or more of the optional TLVs, i.e. in TLV 1 to TLV n of the LLDP DU. Since each of the switches uniquely corresponds to a specific turbine, the subnetwork downstream the switch can be related to that specific wind turbine. Thus, also the IP addresses of the devices contained in the subnetwork of this specific wind turbine can be related to the identified turbine (Step S705).

Figure 8:
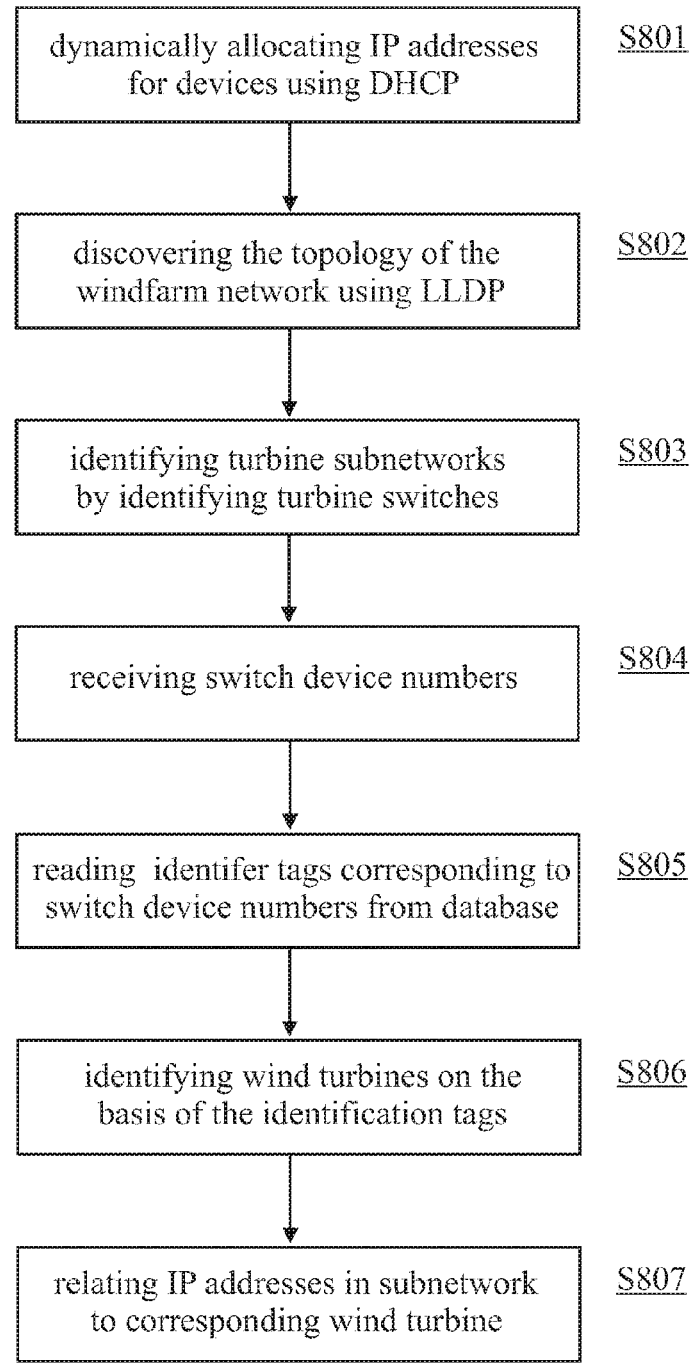
FIG. 8 is a flowchart of a setup process according to an even further embodiment of the present invention.

FIG. 8 is a flowchart of a setup process according to an alternative implementation of the above described setup process. Therein, the steps of dynamically allocating IP addresses using DHCP (Step 801), discovering the network topology using LLDP (Step S802), and identifying wind turbine subnetworks by identifying turbine switches (Step S803) are basically identical to the steps described before. Different from the setup process described hereinbefore, in the present implementation the LLDP DU does not contain a reference to the wind turbine number. However, the device number of the wind turbine switch, e.g. the chassis ID, is received in the LLDP package (Step S804). Next, an identifier tag corresponding to the switch device number is read from a database (Step S806). On the basis of this identifier tag, the wind turbine including the switch can be reliably identified (Step S806). Thus, the IP addresses of the devices in the subnetwork corresponding to the switch can be related to the identified wind turbine.

Figure 12:
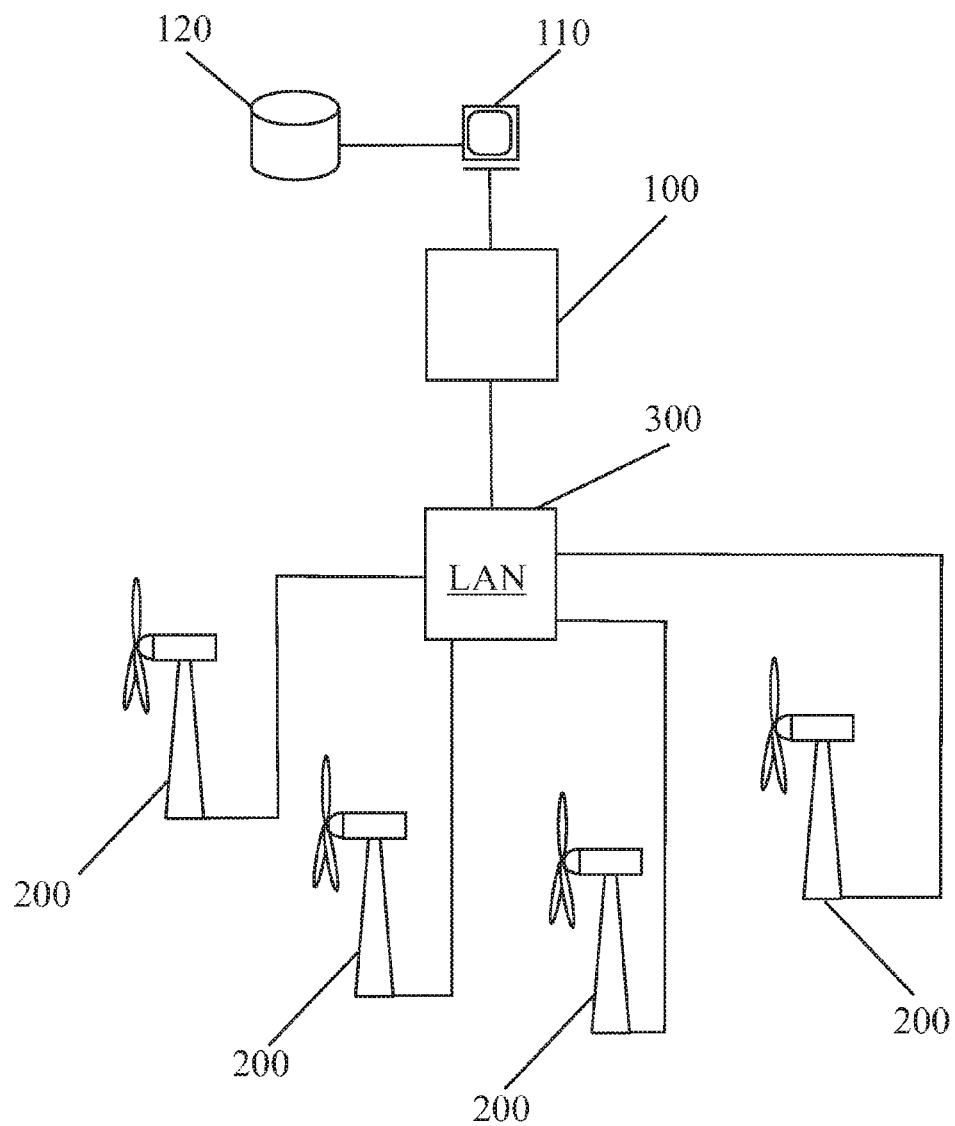
FIG. 12 shows a windfarm network according to an aspect of the present invention.

FIG. 12 shows a windfarm network which is adapted to carry out the above-described process. In particular, a database 120 is connected to an LLDP server 110. Database 120 contains information relating device numbers of devices connected to the windfarm network to specific wind turbines including the devices. When LLDP server 110 receives a device number, e.g. the chassis ID, in the LLDP package, it reads an identifier tag corresponding to the device number from the database. On the basis of this identifier tag, the wind turbine including the device is reliably identified. Thus, the IP addresses of the devices in the subnetwork corresponding to the switch are related to the identified wind turbine. It should be understood that in the context of the present invention the devices used in the wind turbines and in the windfarm network are typically adapted for DHCP and LLDP.

Although in the different implementations described above the subnetwork was identified by identifying the wind turbine switch, it should be understood that the wind turbine subnetwork may alternatively or in addition also be identified via another device installed in the wind turbine. Especially, the subnetwork may be identified by identifying the wind turbine controller. In this case, the wind turbine controller may include a memory card on which the identifier tag for the turbine is stored. According to another embodiment of the present invention, one or more extra network devices for sending an identifier tag may be installed in each of the wind turbines.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A method for automatically configuring a local network in a windfarm, said method comprising:
    firstly, automatically assigning an Internet Protocol (IP) address to a device positioned within a wind turbine in the local network;
    automatically receiving an identifier tag from the device after the IP address is assigned to the device, the identifier tag including at least one of a pre-assigned name and a pre-assigned number of the wind turbine including the device;

identifying a wind turbine associated with the identifier tag; and automatically relating the assigned IP address of the device to the wind turbine in the windfarm which is identified by the identifier tag.

2. The method according to claim 1, wherein the device sends the identifier tag on request.

3. The method according to claim 1, wherein the IP address is permanently assigned.

4. The method according to claim 1, wherein the IP address is dynamically assigned.

5. The method according to claim 1, wherein the IP address is assigned using a dynamic host configuration protocol.

6. The method according to claim 1, wherein said method is repeated for some or all devices connected to the local network.

7. A method for automatic setup of a local network in a windfarm, said method comprising:

firstly, automatically allocating Internet Protocol (IP) addresses to a plurality of devices connected to the local network, wherein at least one device of the plurality of devices is positioned within a wind turbine;

automatically discovering a topology of the local network;

automatically identifying at least one wind turbine subnetwork;

receiving an identifier tag for the at least one wind turbine subnetwork after the IP addresses are allocated to the plurality of devices, the identifier tag including at least one of a pre-assigned name and a pre-assigned number of a wind turbine corresponding to the at least one wind turbine subnetwork;

identifying a wind turbine in which the at least one wind turbine subnetwork is located based on the identifier tag; and relating the automatically allocated IP addresses of the devices in the at least one wind turbine subnetwork to the wind turbine identified by the identifier tag.

8. The method according to claim 7, wherein the identifier tag is received from a device within the at least one wind turbine subnetwork.

9. The method according to claim 8, wherein the device is a wind turbine switch.

10. The method according to claim 8, wherein the device is a wind turbine controller.

11. The method according to claim 7, wherein the IP addresses are dynamically allocated using a Dynamic Host Configuration Protocol (DHCP).

12. The method according to claim 7, wherein automatically discovering a topology of the local network comprises detecting device numbers of discovered devices.

13. The method according to claim 12, wherein the identifier tags are read from a database relating device numbers to individual wind turbines and the automatically allocated IP addresses are related to the identified wind turbines.

14. The method according to claim 8, wherein a Link Layer Discovery Protocol (LLDP) is used.

15. A windfarm network, comprising:

a wind turbine comprising at least one device positioned within said wind turbine, said at least one device connected to said windfarm network;

a database including an assigned Interact Protocol (IP) address for said at least one device, said assigned IP address at least one of statically and dynamically assigned to said at least one device automatically; and an identifier tag sending mechanism which is adapted to send an identifier tag corresponding to a number of said at least one device after said IP address is automatically assigned to said at least one device, said identifier tag comprising at least one of a pre\-assigned number of said wind turbine and a pre-assigned name of said wind turbine so that a specific wind turbine in a windfarm is identified by said identifier tag and said automatically assigned IP address of said at least one device is uniquely related to said specific wind turbine in said windfarm via said identifier tag.

16. The windfarm network according to claim 15, wherein said identifier tag sending mechanism is a wind turbine switch or a wind turbine controller.

17. The windfarm network according to claim 15, wherein said identifier tag sending mechanism contains said database, said database relating said device numbers of said at least one device connected to said windfarm network to specific wind turbines comprising said at least one device.

18. The windfarm network according to claim 15, wherein said at least one device connected to said windfarm network is adapted for Dynamic Host Configuration Protocol (DHCP) and Link Layer Discovery Protocol (LLDP).

\* \* \* \* \*